United States Patent Office 3,217,070
Patented Nov. 9, 1965

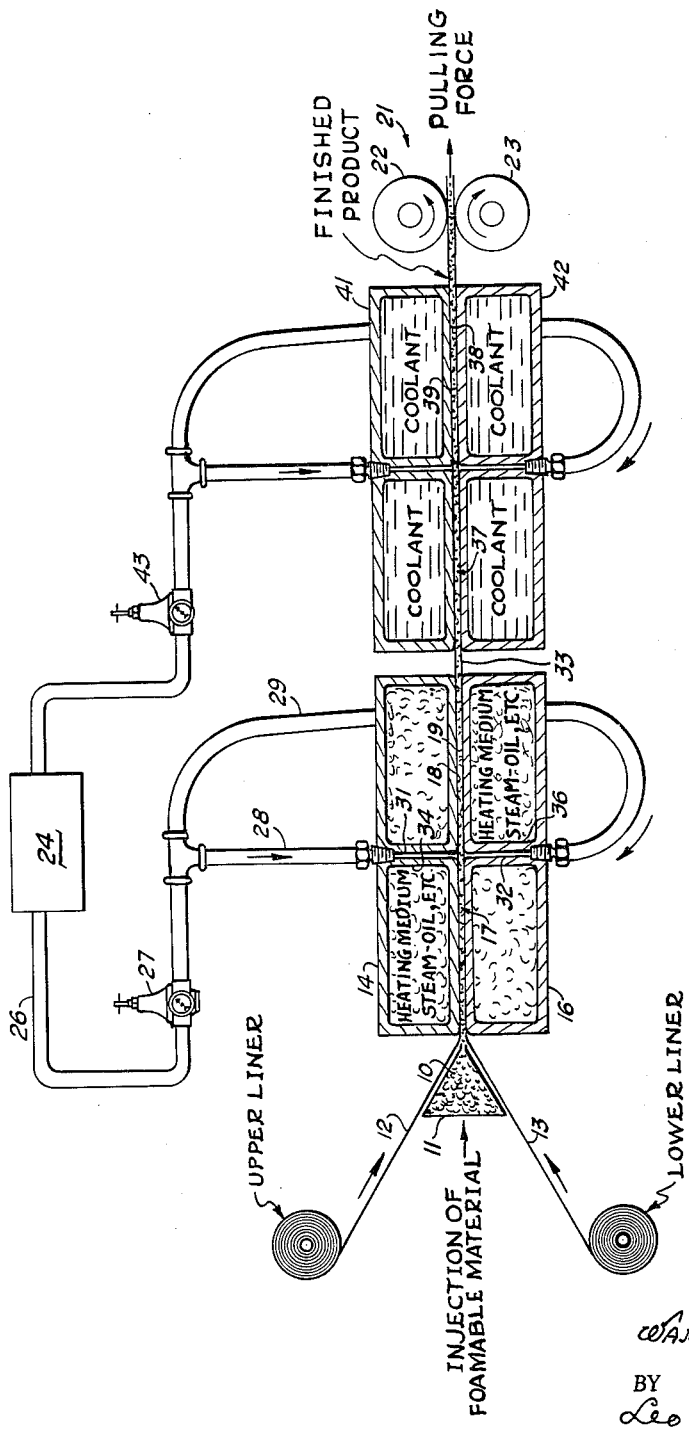

3,217,070
MANUFACTURE OF LAMINATED BOARD
STRUCTURES
Warren A. Stewart, Monkton, Md., assignor to Koppers Company, Inc., a corporation of Delaware
Filed June 19, 1963, Ser. No. 289,043
3 Claims. (Cl. 264—47)

This invention relates to the manufacture of a laminated board structure in the form of continuous web and, more particularly, to the production of a multi-layer continuous web structure from facing sheets of flexible materials separated by a layer of low density cellular plastic bonded thereto.

In the manufacture of shipping containers in particular, laminated board structures have been produced from a variety of materials. One such board structure is a laminated kraft board comprising a multiplicity of laminations of kraft board; another board structure comprises a core of low grade jute or chip board filler bonded to kraft liner facings, and still another familiar board structure, corrugated board, comprises outer facing sheets of kraft paper separated by a fluted corrugated medium bonded thereto.

Although these types of board structure have presented serious problems which are individually peculiar to their particular manufacture, this invention provides a solution to a still different and difficult problem arising during the manufacture of a relatively new board structure now being produced. This board comprises a core of low density cellular plastic interposed between and bonded to flexible facing sheets.

In general, the method for producing a continuous web of the last-described board structure comprises the steps of disposing evenly between advancing spaced flexible sheets the beads of an expandable plastic, such as polystyrene; passing these sheets and the accompanying plastic beads through a heating zone thereby causing the plastic beads to expand into an integral cellular structure, which becomes affixed to the opposed surfaces of these sheets and thereafter cooling the composite web structure so produced.

During the expansion stage the increase in size of the beads or pellets of expandable, or as it is sometimes referred to, foamable, plastic generates appreciable pressure which must be restrained in order to produce a web of controlled dimension and quality. Although rolls may be used to effect this restraint, flat restraining surfaces are superior for this purpose as they involve fewer moving parts and provide for the transfer of heat into and out of the moving web with greater speed and economy. However, due to the generation of substantial pressure during expansion by the foamable plastic, especially in the case of polystyrene, the friction generated between the web and the stationary flat heat transfer surfaces as a result of this expansion requires the expenditure of an enormous amount of power to effect movement of a continuous web of substantial width at production speeds, which may be at the rate of several feet per minute.

It is, therefore, the object of the present invention to provide means for reducing the friction force between the outside surfaces of the continuous web and the heat transfer surfaces to permit the transport of the web through the formative stage at high production speeds with the expenditure of relatively small amounts of power, without impairing the surfaces of the web so as to reduce its ability to receive printed matter thereon and without diminishing appreciably the effectiveness of the heat transfer operations performed during and after the expansion of the foamable plastic core.

The above object is attained in the present invention by providing means for the introduction of a thin film or layer of air or vapor between each outer surface of the moving web and the heat transfer surfaces contiguous therewith to offset to the desired degree the friction normally attendant the outwardly directed force occurring in the expansion of the plastic core.

The exact nature of this invention as well as other objects and advantages thereof will be readily apparent from consideration of the following specification relating to the annexed drawing in which an embodiment for the practice of this invention is schematically represented.

This structure is used in the preparation of a continuous web of board through the execution of a series of steps: interposing between spaced opposed facing sheets of kraft paper a layer of expandable polystyrene beads, expanding the beads between heated platens as the facing sheets and the accompanying beads pass therebetween, cooling the facing sheets and the newly expanded plastic core integrated therewith by passage between cooling platens to cause the plastic to become rigid with the expansion and cooling steps being conducted while simultaneously introducing air under controlled pressure between each of the facing sheets and the opposed surfaces of the several platens.

After formation of the board structure as a continuous web, the web may be severed into desired widths and lengths and blanks for the formation of shipping containers can be prepared from these subdivided portions employing conventional procedures for the manufacture of blanks from corrugated board.

In accordance with this embodiment expandable polystyrene beads 10 marketed under the trademark Dylite (containing for each 100 parts by weight thereof 5–30 parts by weight of an aliphatic hydrocarbon boiling in the temperature range 35–60° C.) are introduced at a controlled rate from distributor 11 between upper and lower kraft paper liners 12 and 13 respectively. Distributor 11 may employ vibratory means (not shown) to dispense beads 10 at a controlled rate. Liners 12 and 13 with the expandable polystyrene beads 10 arranged therebetween are drawn in spaced parallel relation between upper and lower parallel spaced heating platens 14, 16 respectively.

The heat for the plenum chambers in platens 14, 16 is provided by circulating therein a heating medium such as steam at about 50 p.s.i. gage. Passage of the expandable polystyrene beads through the heating zone 17 between platens 14 and 16 enables the expansion of the polystyrene beads by the volatilization of the aliphatic hydrocarbon component to form an integral cellular structure with those portions thereof in contact with liners 12, 13 becoming affixed or bonded to these sheets.

During and after the period of expansion of the polystyrene beads 10 substantial outward pressure is exerted against the faces 18, 19 of platens 14 and 16, respectively resulting from this expansion. Because of the large areas of contact between the newly formed unit and the faces 18, 19 a very high friction force is generated. However, by the use of this invention it is expected that the value of the coefficient of friction at the liner-platen interface and therefore the friction force may be reduced as much as 95 percent.

Drive means 21 comprising pull rolls 22 and 23 or, if preferred, a pair of opposed continuous belts, are used to effect the transport of the board structure in the several formative stages by grasping the cooled web with its plastic core unified with liners 12, 13 and pulling the formative elements through heating zone 17 at a speed providing a residence time therein of from several seconds to several minutes. Simultaneously with the transport of the formative components and completed board through the system, air is injected under controlled pressure from a source 24 of dry, filtered air under pressure to the interfaces between the emerging web structure and platens 14, 16. This air is distributed via conduit 26, pressure regulator 27 connected in line 26 and the diverging pipes 28 and 29 leading to platens 14 and 16, respectively, and then to the interfaces via passages 31 and 32. As the air is discharged from passages 31 and 32 to the regions between face 18 and liner 12 and between face 19 and liner 13 at a pressure in the range from about 8–40 p.s.i.g., it spreads out radially over these interfaces even upstream counter to the direction of movement of the web establishing a thin film of air over both the upper and lower surfaces of the web of board structure 33.

By employing various settings of pressure regulator 27, the injection pressure of the air may be varied to achieve various apparent coefficients of friction without producing a serious decrease in the efficiency of heat transfer. The particular optimum pressure to be employed is, of course, dependent upon the contact area between the unified web and the platens and the particular natures of the surfaces involved and involves only a routine adjustment of pressure regulator 27 while observing the decrease of the power input to drive means 21 operating at some pre-set speed of rotation. In fact, experiments have shown that if the air injection pressure is fixed at any given value, then for that value a condition of equilibrium may be established, which will actually cause the unified web 33 to float between faces 18, 19. By the proper setting of regulator 27 the apparent coefficient of friction between liners 12 and 13 and faces 18 and 19, respectively, can be reduced by upwards of 85 percent while reducing the efficiency of heat transfer by as little as 3 percent.

The air film created and maintained on each side of web 33 is extremely thin, being about .001 to .004 inch in thickness, thereby enabling retention of an unexpectedly high rate of heat transfer in spite of the great drop in the coefficient of friction. Also, by employing extremely thin air films the total air consumption is reduced to a very low level.

In order to insure against the tearing of fibers in either of liners 12 or 13, the faces 18, 19 of platens 14, 16 must be accurately milled and ground to a high degree of flatness.

Although in the embodiment shown and described the pressurized air for providing the lubricating films or cushions is indicated as being injected through the single passage 31 disposed in web 34 in platen 14 and through the single passage 32 in web 36 in platen 16, it should be understood that neither the exact location of the point or points of injection of the gas under pressure or the number or extent of such points of application is critical, since the formation of a stable cushion of air over the desired platen area is readily accomplished under the control of pressure regulator 27.

After leaving the heating zone 17, the unified web 33 of expanded board structure passes through a cooling zone 37, wherein the foaming action is stopped and web 33 is imbued with rigidity. Between the time web 33 leaves heating zone 17 and enters cooling zone 37, the board may be passed through a pair of adjustable rollers (not shown), which serve to compress the still-hot web 33 to some desired thickness. After leaving cooling zone 37, the web of board 33 now strong and rigid and possessing high water- and vapor-resistance, shock-resistance, and thermal insulating properties is moved on to receive subsequent operations thereon depending on the ultimate use intended for the unified web. If the web has been prepared for the formation of container units it will be converted into blanks by slitting, scoring and cutting followed by folding and gluing to present a configuration which may quickly and simply be reoriented to form a carton exhibiting low shock transmission, localized puncture failure and resistance to fungus and insects.

Lubricating gas is likewise provided in cooling zone 37 between the faces 38, 39 of the upper cooling platen 41 and the lower cooling platen 42, respectively, and the upper and lower surfaces of web 33. Air under pressure may be supplied from source 34 and distributed through a system of piping employing a pressure regulator 43 in the manner described in the case of the heating platens 14, 16. It is, of course, feasible to supply the air under pressure to both the heating and cooling platens through a common pressure regulator, since in many applications air films of substantially identical thicknesses are required in both instances.

The thickness of the integrated web 33 formed in the fashion described in the embodiment shown is determined by the spacing of heating platens 14, 16 and to a degree by the spacing of coolings platens 41, 42. Thus, although these several platens should be rigidly supported relative to each other their mountings must permit selective variation of the spacings therebetween to enable the production of a variety of web thicknesses.

By controlling the number of expandable polystyrene beads 10 interposed per unit of area between upper and lower liners 12 and 13; the temperature of the heating step; the residence time in the heating zone 17 and, in the event of the use of compressing rolls immediately after the heating step, the spacing between such compressing rolls, board structures having selectively variable degrees of density, rigidity, water-proofness, grease proofness, scuff-resistance and compression strength may be produced.

Although liners 12 and 13 have been designated as being kraft paper, other flexible sheet materials, such as polymeric sheets (cellulose foil, polyethylene, vinyl resins, and the like) and various metallic foils, such as aluminum foil, may be employed.

In the event that the natures of the plastic core of web 33 (i.e., polystyrene, polyvinyl chloride) and of the upper and lower liners are such that the expanding pressure generated by the foamable material is not alone productive of the desired bond between the several components of the web, various adhesives can be used to effect the proper adherence.

Obviously, modifications and variations of this invention are possible in light of the above teachings and it is therefore to be understood that the terms "beads" or "pellets" are broadly intended to include the use of expandable plastic introduced between the facing sheets in various shapes and sizes such as in aggregates of particles or in slabs and that within the scope of the appended claims, the invention may be practiced otherwise than as specifically described.

What is claimed is:
1. A method for the manufacture of a continuous laminate having a core of an expandable plastic between opposed liner surfaces comprising the steps of:
  (a) moving a plurality of spaced flexible liners through a heating zone comprised of fixable heated abutments having opposed spaced apart flat surfaces;
  (b) distributing expandable plastic material between the outer ones of said liners to form a laminate moving through said heating zone;
  (c) maintaining said laminate in said heating zone for a length of time sufficient to cause said plastic to expand and urge said outer liners toward said abutments, said plastic coalescing into an integral cellular structure bonded to said liners;
  (d) controllably maintaining a film of a gas between the outer surfaces of the outer liners and the immediately adjacent surfaces of the abutments whereby the friction at the interface between the outer liners and the adjacent abutments is substantially reduced; and
  (e) cooling the laminate so formed.
2. In a mechanism for the manufacture of a continuous laminate having a core of expandable plastic material, the combination comprising:
(a) a plurality of fixable flat heating surfaces disposed in spaced apart relation;
(b) means for continuously pulling a plurality of liner surfaces between said heating surfaces;
(c) means for distributing said expandable plastic between said liner surfaces as a core and forming said laminate;
(d) means for interposing a thin layer of air at the interface between the outer surfaces of said laminate and the juxtaposed heating surfaces;
(e) means for supplying air under pressure to said interposing means whereby, as the plastic material expands when exposed to heat and forms an integral cellular structure and said outer liners are urged toward said juxtaposed heating surfaces, the frictional force at the interface between said outer liner and said heating surface is substantially reduced; and
(f) means for cooling the laminate so formed.

3. In apparatus for producing a continuous web whereby a continuous laminate comprised of outer liner surfaces and expandable polystyrene particles distributed therebetween is passed through a heating zone comprised of fixable heating surfaces adapted to transmit heat to said polystyrene particles so that they expand and coalesce into an integral cellular core bonded to said liner surfaces, the improvement comprising:
(a) means for injecting air under pressure at the interface between juxtaposed heating surfaces and liner outer surfaces whereby said liner outer surfaces are maintained in spaced relation and the force required to move said laminate through the heating zone is substantially reduced; and
(b) means for regulating the pressure of the injected air.

References Cited by the Examiner

UNITED STATES PATENTS

| | | | |
|---|---|---|---|
| 2,909,804 | 10/59 | Means | 18—4 |
| 2,962,407 | 11/60 | Aykanian | 264—53 XR |
| 2,983,962 | 5/61 | Merz et al. | 264—47 |
| 2,998,501 | 8/61 | Edberg et al. | 264—26 XR |
| 3,037,897 | 6/62 | Pelley | 264—47 XR |
| 3,111,709 | 11/63 | Reed | 264—47 XR |

FOREIGN PATENTS

| | | |
|---|---|---|
| 1,136,263 | 5/57 | France. |
| 1,262,090 | 4/61 | France. |

ROBERT F. WHITE, *Primary Examiner.*

ALEXANDER H. BRODMERKEL, *Examiner.*